United States Patent [19]

Futrell, II

[11] Patent Number: 4,866,985
[45] Date of Patent: Sep. 19, 1989

[54] BUCKET WHEEL ASSEMBLY FOR A FLOW MEASURING DEVICE

[75] Inventor: James C. Futrell, II, Picayune, Miss.

[73] Assignee: United States of America as represented by the Secretary of Interior, Washington, D.C.

[21] Appl. No.: 94,976

[22] Filed: Sep. 10, 1987

[51] Int. Cl.⁴ ............................................. G01D 21/00
[52] U.S. Cl. ................................. 73/170 A; 73/861.79; 416/234
[58] Field of Search ................ 73/170 A, 861.79, 189, 73/861.83, 861.85; 416/197 A, 234

[56] References Cited

U.S. PATENT DOCUMENTS 1,593,291  7/1926  Critchlow .............................. 73/189
3,275,082  9/1966  Stark ..................................... 416/234

Primary Examiner—Jerry W. Myracle
Attorney, Agent, or Firm—E. Philip Koltos

[57] ABSTRACT

A bucket wheel assembly for use in a flow measuring device is disclosed which comprises a one-piece, lightweight molded plastic disk having a plurality of roughly conical cups connected to a central ring. The central ring is mounted on a shaft and the disk rotates in response to fluid pressure in order to generate a signal proportional to flow velocity. The bucket wheel is advantageous over prior art versions in that it is responsive only to the horizontal component of flow velocity, when rigidly held, and thus gives truer and more accurate information with regard to current flow, particularly when used in current meters measuring flowing streams and rivers.

3 Claims, 1 Drawing Sheet

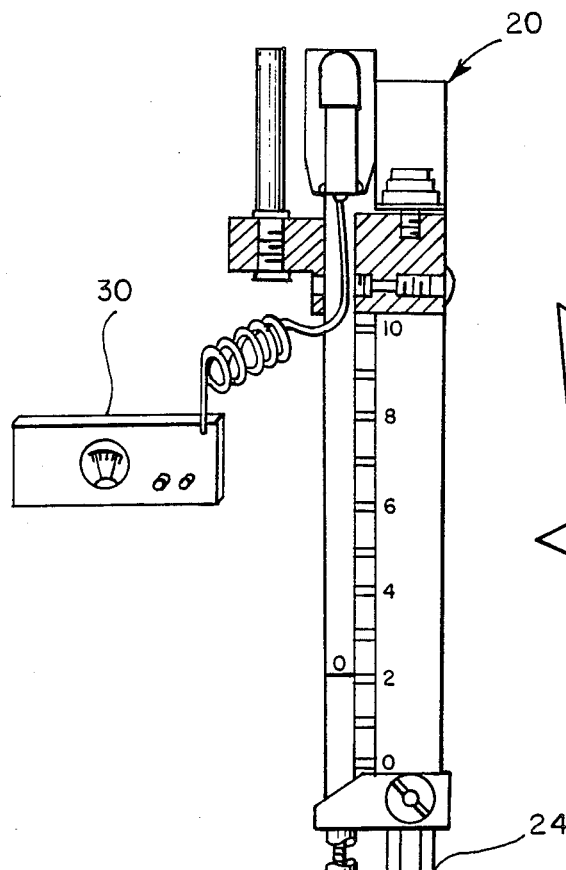
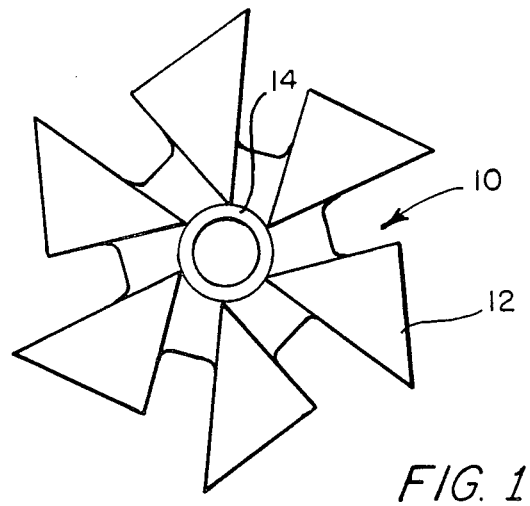
FIG. 1
FIG. 2

BUCKET WHEEL ASSEMBLY FOR A FLOW MEASURING DEVICE

FIELD OF THE INVENTION

The invention relates to a bucket wheel assembly for use in a current meter, and more particularly to a lightweight, one-piece, plastic disk having a plurality of closed conical cups which is responsive to only the horizontal component of flow velocity.

BACKGROUND OF THE INVENTION

In the scientific study of streams and rivers, it is desirable to take accurate readings of the various hydrological characteristics of the stream, particularly with regard to water flow. Many devices have been constructed in the past which are able, through various means, to measure the flow velocity of a liquid. Among these devices are the current meter disclosed in U.S. Pat. No. 1,034,399 (Buck) which employs a chamber and tube system for measuring velocity, the current meter disclosed in U.S. Pat. No. 1,709,100 (Tice) which employs an upright cylindrical runner to measure current flow velocity, and a flow meter as disclosed in U.S. Pat. No. 3,164,020 (Grover et al.) which uses a bladed rotor in the determination of fluid flow.

Another way of measuring flow velocity known in the prior art is to use a wheel of small buckets or cups, such as those disclosed in U.S. Pat. No. 1,593,291 (Critchlow). The bucket wheel device can be mounted upon a shaft and rotates in response to flow, generating a signal proportional to the fluid velocity. This bucket wheel design is quite commonly observed in anemometers, such as disclosed in U.S. Pat. No. 3,541,855 (Frenzen et al.).

Previous versions of bucket wheels designed for use in flow meters have generally been fabricated of metal and are hand assembled. These metal versions are generally machined under close tolerances, soldered on a jig, and then plated. This process creates bucket wheels or cup assemblies having many small irregularities that cause the devices to scatter around a standard rating. Further, these versions respond to the vertical component of velocity in addition to the horizontal component, thus causing further inaccuracies in the readings. What is desired is a bucket wheel assembly which can take accurate measurements of flow, which is lightweight but durable, and which is responsive only to the horizontal component of flow velocity, and non-responsive to the vertical component. It is also desirable to have a bucket wheel assembly which is cheaper and more economical to use than the prior art metal versions.

SUMMARY OF THE INVENTION

In accordance with the present invention, a lightweight, durable bucket wheel assembly for use in a flow measuring device is provided which comprises a one-piece molded plastic disk having a plurality of co-planar conical cups disposed circularly around a ring, the ring being mountable upon a shaft and rotatable in response to flow in order to generate a signal proportional to the horizontal component of flow velocity. It is preferred that the disk be composed of a foamed polycarbonate or polyethylene plastic. Although cups made of expanded styrene have been used in anemometers (see U.S. Pat. No. 3,699,801 (Jones) and 42 *J. Sci. Instrum.* 414 (June 1965)), a one-piece molded plastic bucket wheel assembly for use in an underwater flow measuring device has not previously been disclosed.

BRIEF DESCRIPTION OF THE DRAWINGS

FIG. 1 is a top view of the bucket wheel assembly of the present invention.

FIG. 2 is a schematic side view of a flow measuring device incorporating the bucket wheel assembly of the present invention.

DETAILED DESCRIPTION OF THE PREFERRED EMBODIMENTS

According to the present invention, a bucket wheel assembly 10 for use in a flow measuring device is provided, as observed in FIG. 1, which comprises a one-piece, lightweight molded plastic disk having a plurality of closed, roughly conical cups 12 disposed circularly and connected to a central ring 14. The ring allows the disk to be mounted upon a shaft so that the disk will rotate in response to fluid pressure against the cups, and generate a signal that is proportionate to the velocity of the fluid. The cups 12 of the bucket wheel assembly 10 should be roughly co-planar, and disposed in a symmetrical fashion around the ring. The bucket wheel of the present invention preferably has six cups, but greater or fewer cups can be used as desired, depending on the nature of the intended use. The density of the bucket wheel and the balance of this assembly is a critical matter relative to the extreme low and high-velocity performance of the molded bucket wheel respectively. A blowing agent is used to foam the molded plastic part to alter the density of the part, as desired. Therefore, a small bubble in one cup could adversely affect the balance of the part.

The bucket wheel assembly can be constructed of any lightweight, durable plastic material having the following characteristics: high stiffness, good dimensional stability, resistance to warpage, toughness, resistance to stress cracking, resistance to ultraviolet degradation, no water absorption, and the ability to accept a blowing agent to attain the desired densities and make a high-quality part in a screw-injection mold. Out of several materials tested for suitability for use in the present invention, polyethylene and a polycarbonate plastic known by the trade name "Lexan" were shown to be superior to other plastics in most aspects. The Lexan bucket wheel assembly appeared to be the strongest of the plastics tested, and was able to avoid major impact damage. In addition to its durability, the Lexan bucket wheel was able to provide accurate and consistent readings of flow velocity. It is preferred that the bucket wheel assembly be manufactured from a one-piece mold, and constructed using a screw-injection molding machine. Screw-injection molding assures the maximum uniformity from part to part and allows the development of a standard rating rather than individual ratings for current meters. This standard rating will have less scatter at the low end than standard ratings for previous metal bucket wheels. This process makes the polycarbonate bucket wheel of the present invention lightweight and durable, yet inexpensive as well.

In measurements of stream flow, the horizontal component of velocity in the streamline is the desired vector to be measured. With prior art metal bucket wheels soldered on a jig, the undesired vertical component of stream flow velocity affected the response of the bucket wheels, giving inaccurate readings of the flow. The bucket wheel assembly of the present invention overcomes this problem of the prior art in that it is non-responsive to the vertical component of velocity and is only responsive to the desired horizontal component when rigidly held and aligned with the flow streamline. As a result, the bucket wheel assembly of the present invention gives a truer, more accurate reading when used to measure stream flow.

In the preferred mode of operation, the bucket wheel assembly of the present invention is used with a flow measuring device designed for taking underwater measurements of velocity in streams and rivers. One of several measuring devices for the purpose of employing the bucket wheel assembly of the present invention is shown schematically in FIG. 2. This flow measuring device 20 or wading rod, more fully described in my co-pending U.S. application, Ser. No. 094,975, filed Sept. 10, 1987, is comprised of a base 22, main rod 24, adjustable rod 26, wire connectors 28, current meter 32, which includes the bucket wheel assembly 10, and a signal receiving means 30.

When in use, the flow from a stream turns the bucket wheel assembly 10 inside the current meter 32, and a signal proportional to the flow velocity is transmitted by the meter through wire connectors 28, which transmit the signal from the current meter through adjustable rod 26 and into the signal receiving means 30. A suitable signal receiving means for this apparatus is a current meter digitizer (not shown) which is capable of receiving the signal from the current meter, and translating it into a reading of revolutions per unit time or into an instantaneous reading of velocity. The current meter 32 can be an vertical-axis-flow meter which employs a bucket wheel apparatus. The plastic bucket wheel assembly of the present invention is particularly suitable for either the cat's whisker-type current meter or an optic head-type current meter of the type AA or pygmy current meter design. Examples of these meters would be: Scientific Instruments of Milwaukee, Wis., type AA current meter, model #1210, and the pygmy or mini current meter, model 1205; also the Teledyne Gurley Current Meters of Troy, N.Y., Price Current Meter type AA, Model #622, and pygmy meter, model #625.

In operation, the flow measuring device 20 or wading rod described above is taken by the hydrographer into a stream or river, and the base 22 is placed in a suitable spot on the river floor. after leveling the device, the depth of the river can be measured using gradations found on the main rod 24. The adjustable rod 26 can be adjusted so that the current meter 32 including the bucket wheel assembly 10 is placed at the specific depth at which the flow is to be measured. Typically, the current meter is set at a level of either six-tenths or two-tenths and eight-tenths of the total stream depth at the point of the flow measurement. The two-tenths and eight-tenths velocity observations can then be averaged to give a flow reading. In any case, the meter can be adjusted to any desired level in order to make a flow measurement.

Once the level of the current meter is set, the flow of the moving river will cause the bucket wheel assembly to flow at a given rate, and this rotation will generate a signal in the current meter which is transmitted by the wire connectors to the signal receiving means. When a current meter digitizer is used as the signal receiving means, the signal will be translated into either a reading of revolution/time, or an instantaneous velocity reading. The wading rod is only one of many suspension devices used with current meters. An ice rod can be used to suspend the pygmy and F-combo current meters through a hole in the ice to measure the flow of a river under ice cover. A sounding cable, which is commonly known as a well-logging cable, is used to suspend most types of current meters from a boat, bridge or a cableway to measure the flow of a river. Using the bucket wheel assembly of the present invention, the signal generated by the current meter will be proportional only to the horizontal component of flow velocity when rigidly held. The plastic bucket wheel has been observed to be non-responsive to the vertical component of flow velocity in rod suspension. As a result, an accurate reading of the desired horizontal component of current flow velocity is possible through use of the bucket wheel assembly of the present invention.

What is claimed is:

1. A bucket wheel assembly for use in an underwater flow measuring device measuring a horizontal component of velocity of an underwater flow comprising a one-piece light-weight molded plastic disk having a plurality of closed, roughly conical cups disposed circularly and connected to a central ring mountable upon a rotatable shaft, said disk being capable of rotating in response to the movement of a fluid and generating a signal proportional to the horizontal component of the velocity of the fluid and means for supporting and aligning said assembly with the flow streamline.

2. A bucket wheel assembly according to claim 1 wherein the cups are co-planar.

3. A bucket wheel assembly according to claim 1 wherein the disk is comprised of polyethylene or polycarbonate plastic.

* * * * *